United States Patent [19]

Bailey et al.

[11] Patent Number: 4,894,966
[45] Date of Patent: Jan. 23, 1990

[54] FIRE STOPPING APPARATUS

[76] Inventors: Paul R. Bailey, 9020 Dixon Avenue, Richmond, B.C., Canada, V6Y 1E4; Khashayar Yamini, 306 - 1497 Marine Drive, West Vancouver, B.C., Canada, V7T 1B8

[21] Appl. No.: 268,867

[22] Filed: Nov. 8, 1988

[51] Int. Cl.⁴ .............................................. E04B 1/94
[52] U.S. Cl. ........................................ 52/317; 52/232; 52/221; 285/158
[58] Field of Search ....................... 52/1, 232, 317, 98, 52/99, 100, 221; 137/72, 75; 285/158

[56] References Cited

U.S. PATENT DOCUMENTS

| | | |
|---|---|---|
| 3,678,634 | 7/1972 | Wise et al. |
| 3,864,888 | 2/1975 | McMarlin . |
| 4,109,423 | 8/1978 | Perrain ................................. 52/1 |
| 4,186,707 | 1/1979 | Gaillot et al. . |
| 4,221,092 | 9/1980 | Johnson ................................. 52/232 |
| 4,307,546 | 10/1981 | Dolder . |
| 4,419,535 | 12/1983 | O'Hara .............................. 52/232 X |
| 4,424,867 | 1/1984 | Mallow . |
| 4,538,389 | 9/1985 | Heinen . |
| 4,559,745 | 12/1985 | Wener ............................... 52/232 X |
| 4,748,787 | 6/1988 | Harbeke ............................ 52/232 X |

FOREIGN PATENT DOCUMENTS 2162251 6/1973 Fed. Rep. of Germany .

Primary Examiner—Carl D. Friedman
Assistant Examiner—Creighton Smith
Attorney, Agent, or Firm—Shlesinger & Myers

[57] ABSTRACT

A fire stopping apparatus includes a metal casing having two side walls with co-extensive openings and an annular outer wall extending between the side walls outwardly from the openings, forming an inwardly open, annular channel. The casing has mounts for connecting the apparatus to a building structure. There is an intumescent material within the channel. A resilient gasket extends from the casing and has an annular inner wall extending inwardly beyond the intumescent material.

16 Claims, 1 Drawing Sheet

FIRE STOPPING APPARATUS

BACKGROUND OF THE INVENTION

This invention relates to an apparatus employing intumescent materials for stopping the spread of fires through openings occupied by plastic pipes.

Pipes, other conduits and service penetrations must pass through internal dividers, such as floors and walls of buildings. Openings must be left for such pipes and conduits when pouring concrete, for example. These openings are typically larger than the pipes themselves. The existence of such openings decreases fire resistance of walls and floors between adjacent units.

Metallic service penetrations do not achieve the desired fire resistance. Thermal conductance leads to a potential for fire to pass through walls or floors by igniting new fires on the unexposed side of the divider. However, a greater problem exists when plastic pipes are used because the pipes themselves are not fire resistant. A fire may cause the pipes to melt and smoke and fire can pass through the resulting openings and thus through the divider.

For this reason, plastic pipes have not been widely used in buildings where such a requirement for fire resistant internal dividers exists.

It is known to fill up the space between the divider and a plastic pipe with an intumescent material. These are materials which expand upon exposure to heat of an intensity typical of fires. A flat strip of the intumescent material may be formed into an annular shape and fitted about the pipe at the opening in the divider. The heat resulting from a fire causes the intumescent material to expand and, in theory, fill up the void left by the melted pipe. However, the design and construction of such pipe openings must be done with care to assure that they will function as required. Separate certification of each different configuration of opening is frequently required. This certification process has prevented the widespread adoption of plastic pipes in combination with intumescent materials for such applications as apartment buildings.

Attempts have been made to provide standard fittings for closing off openings for plastic pipes or the like. For example, a fire barrier of this type is disclosed in U.S. Pat. No. 4,221,092 to Johnson. In this patent, an intumescent material is located within an annular channel of a metal member fitted within the opening of a barrier. However, the construction requires the metal member to be sized for the particular opening in the barrier and a close fit is required between the metal member and the particular plastic pipe.

Another fire-proof device of the type is disclosed in U.S. Pat. No. 4,109,423 to Perrain. However, in this case a mechanical device including shutters is used to close off the opening. Such devices may be relatively expensive and subject to jamming if, for example, wet concrete or gout gets into the shutters.

U.S. Pat. No. 4,559,745 to Wexler shows another device for fire stopping of plastic pipes. This patent again relies on a mechanical device, namely a coil spring, to close off the opening.

It is an object of this invention to provide an apparatus for closing off openings for plastic pipes in the event of a fire which can be pre-certified as a unit and will fit a range of different sized openings through barriers.

It is a further object of the invention to provide an apparatus of the type which sealingly engages plastic pipes to stop initial passage of smoke through the opening around the pipe and yet will fit about pipes having different diameters within a limited range.

It is a further object of the invention to provide a fire resistant barrier including a structural member, panels on each side of the structural member, openings in the panels, a plastic pipe passing through the barrier at the openings and apparatuses on at least one side of the barrier employing an intumescent material to seal the openings in the event of fire on one side of the barrier.

SUMMARY OF THE INVENTION

The invention provides a fire-stopping apparatus comprising a metal casing having two side walls with co-extensive openings and an annular outer wall extending between the side walls outwardly from the openings, forming an inwardly open annular channel. There is means on the casing for mounting the apparatus to a barrier. There is an intumescent material within the channel. A resilient gasket extends from the casing and has an annular inner wall extending inwardly beyond the intumescent material.

The invention also provides a fire retardant barrier comprising an internal divider of a building having an opening therein and a first outer side. A plastic pipe extends through the opening. Said fire stopping apparatus is adjacent the first outer wall with the plastic pipe extending therethrough.

DESCRIPTION OF THE PREFERRED EMBODIMENTS

Figure 1:
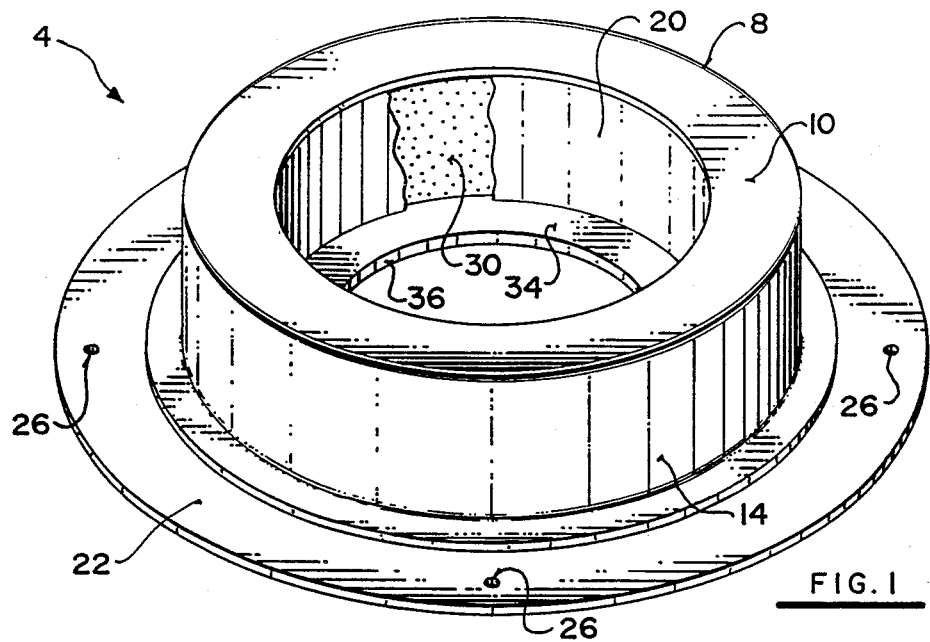
FIG. 1 is an isometric, partly broken away view of a fire-stopping apparatus according to an embodiment of the invention.

Referring firstly to FIG. 1, this shows a fire-stopping apparatus 4 according to an embodiment of the invention. This apparatus 4 with an identical apparatus 4.1 are employed in a fire retardant barrier 6 shown in FIG. 2.

Figure 2:
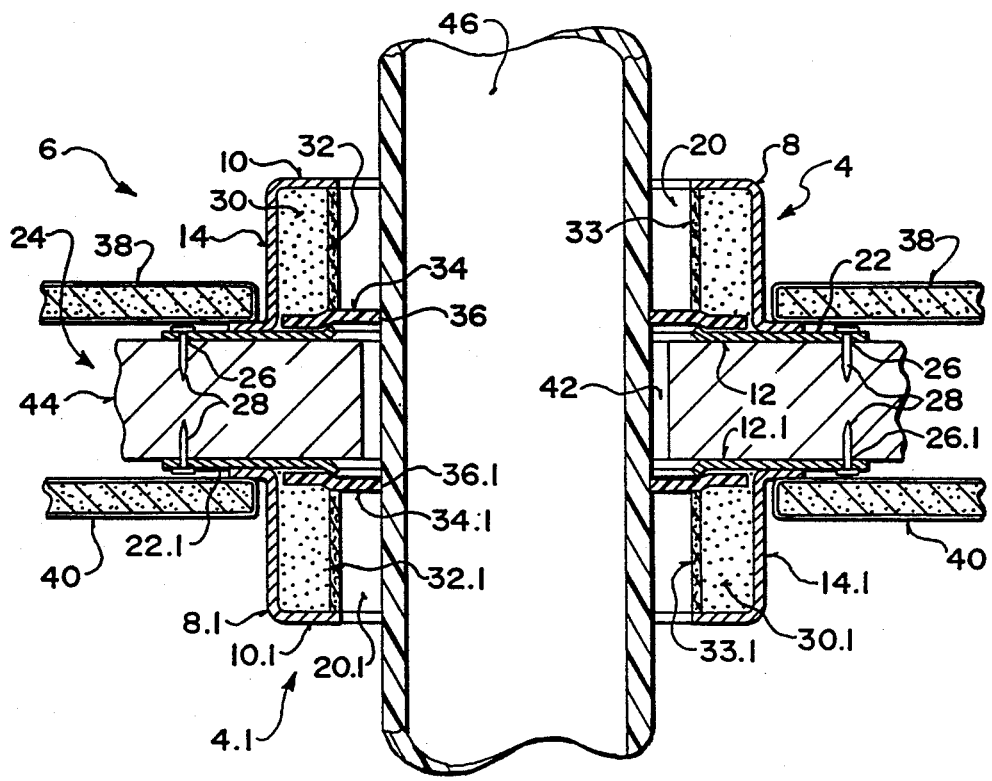
FIG. 2 is a diametric, sectional view of pair of fire-stopping apparatuses forming a fire resistant barrier according to an embodiment of the invention.

The apparatus 4 has a casing 8, typically of steel sheet, having opposite side walls 10 and 12, the latter being shown in FIG. 2. The casing could be of non-metallic construction using materials which are stable in a fire. The apparatus 4 has an outer wall 14 extending between the side walls 10 and 12. The side walls and outer wall together form an inwardly opening, annular channel 20.

A disk-like metal flange 22 extends outwardly from outer wall 14. In this embodiment, flange 22 is an outward extension of side wall 12. There is means on the casing for mounting the apparatus to a barrier, such as wall 24 shown in FIG. 2. In this case, the means for mounting includes a plurality of apertures 26 allowing nails 28 or other fasteners such as screws to connect the apparatus to the barrier. Alternatively, straps connected to the apparatus or other means can be used for connection purposes.

The channel 20 is substantially filled with an intumescent material 30 which forms a ring with an inner wall 32 within the channel. Various intumescent materials may be used, 3M Putty 303 in the preferred embodiment, but others could be used, such as 3M Brand Fire Barrier wrap/strip FS-195, both sold by Electrical Products Divisions of 3M Corporation. The ring is formed by forming a loop of an appropriate sized strip of the material. As is well known, such materials expand upon the application of high temperatures. An annular band 33 of cardboard or other suitable material is fitted about the inner wall 32 in this embodiment to retain the intumescent material although this collar is not necessary.

A resilient gasket 34 extends from the casing 8 and has an inner wall 36 which extends inwardly beyond the annular inner wall 32 of the intumescent material. In the preferred embodiment the gasket is of synthetic rubber, although in alternative embodiments it may be of natural rubber or other elastomeric substances. The gasket of the preferred embodiment is on the same side of the casing as the flange 22. Thus, it is on the cooler side of the apparatus. Alternatively, it may be on the opposite side of the casing or there may be gaskets on both sides.

FIG. 2 shows one type of fire retardant barrier employing apparatuses 4 and 4.1. In some situations only one apparatus may be used on one side of the barrier, but typically the spread of fire in either direction is to be stopped and two apparatuses are therefore employed.

Wall 24 is of stud construction, either metal or wood studs, covered by panels 38 and 40 on each side. Drywall panels are employed in this example, although other panels can be used. In fact, the apparatuses work for various types of walls, such as concrete walls as well. Wall 24 has an opening 42 which passes through the panels 38 and 40 as well as the internal support structure comprising studs 44. The opening provides clearance for a thermoplastic pipe 46. The invention also applies to other plastic conduits and service penetrations. The opening through the studs must be at least as large as the diameter of the pipe though typically it is appreciably larger. The openings in the panels are slightly larger than the diameter of the casings 8 and 8.1 of the apparatuses 4 and 4.1.

As may be seen, the apparatuses are connected to the studs employing nails 28 prior to installation of the drywall panels. Screws or other fasteners can be substituted. The drywall panels are then placed over the flanges 22 and 22.1 of the two apparatuses. The pipe 46 can then be run through the two apparatuses 4 and 4.1 and is tightly engaged by the inner walls 36 and 36.1 of the two gaskets 34 and 34.1.

OPERATION

In normal operation, the apparatuses remain as shown in FIG. 2. However, in the event of a fire, the gasket 34 initially serves to prevent smoke from passing from one side of the wall 24 to the other about pipe 46. Gasket 34 seals the space between the apparatus 4 and the plastic pipe to prevent smoke from passing across wall 24. Upon further application of heat, the intumescent material 30 eventually reaches the temperature when it begins to expand. This begins to occur at 120° C. for the 3M Brand Fire Barrier FS-195 discussed above though this temperature varies widely depending on the intumescent material. Significant expansion begins at 175° C. The gasket 34 is on the cool side of the apparatus 4 so it provides its sealing function as long as possible. Eventually the gasket deteriorates as a result of the heat, but by this time intumescent material 30 has expanded sufficiently to fill the space between inner wall 32 and the pipe 46. Cardboard liner 33 simply gives way under the force of the expanding intumescent material or burns away.

The plastic pipe 46 melts due to the heat, but is compressed inwardly by the expanding intumescent material. The intumescent material expands sufficiently to completely fill the space occupied by the pipe and thus close off the opening through the wall.

The channel 20 formed by side walls 10 and 12 and outer wall 14 tends to direct the expansion of the intumescent material radially inwards so that the expansion is in the desired direction to seal off the opening originally occupied by pipe 46.

Apparatus 4.1 functions in a manner similar to apparatus 4 but stops fires from spreading in the opposite direction, that is fires originating below wall 24 of FIG. 2.

It will be understood by someone skilled in the art that modifications can be made to the invention without departing from the scope of the invention which is to be interpreted with reference to the following claims.

What is claimed is:

1. A fire-stopping apparatus, comprising:
   a metal casing having two side walls with co-extensive openings, and an annular outer wall extending between the side walls, the outer wall being located radially outwardly from the openings, forming an inwardly open, annular channel;
   means on the casing for mounting the apparatus to a barrier about an opening therethrough;
   an intumescent material within the channel; and
   a resilient gasket extending from the casing and having an annular inner wall extending inwardly beyond the intumescent material.

2. An apparatus as claimed in claim 1, wherein the gasket is of an elastomeric material.

3. An apparatus as claimed in claim 2, wherein the gasket is of natural or synthetic rubber.

4. An apparatus as claimed in claim 1, further comprising a metal flange connected to the casing and extending outwardly from the outer wall of the metal casing.

5. An apparatus as claimed in claim 4, wherein the flange and the gasket are on one side of the casing.

6. A fire-retardant barrier, comprising:
   (a) an internal divider of a building having an opening therein and a first outer side;
   (b) a plastic conduit extending through said opening; and
   (c) a fire-stopping apparatus comprising:
      (i) an annular metal casing adjacent the first outer wall, having two side walls with outer edges and openings aligned with the opening in the wall, the plastic conduit extending therethrough, and an outer annular wall extending between the outer edges of the side walls, the annular wall being located radially outwards from openings, forming an inwardly open, annular channel, (ii) means for connecting the casing to the divider so one of said side walls is adjacent said first outer side and a second of said side walls is outwardly spaced from said first outer side, (iii) an annular member comprised of an intumescent material within the casing and extending about the conduit, and (iv) an annular gasket extending inwardly from the casing and having an annular inner wall extending inwardly beyond the intumescent material, the annular inner wall having an inner edge closely fitting about the conduit.

7. A barrier as claimed in claim 6, wherein the gasket is resilient and is adjacent said one side wall of the casing.

8. A barrier as claimed in claim, 6 further including an annular flange extending outwardly from the casing adjacent the first outer side of the divider.

9. A barrier as claimed in claim 8, wherein the means for connecting is on the flange.

10. A barrier as claimed in claim 9, wherein the means for connecting includes apertures on the flange.

11. A barrier as claimed in claim 8, wherein the divider has internal structural members covered with panelling, the flange being between the structural members and the panelling.

12. A barrier as claimed in claim 11, wherein the divider has a second outer side, the barrier including a second said fire-stopping apparatus with said flange thereof being between the structural members and panelling on said second outer side.

13. A fire retardant barrier, comprising:
(a) an internal divider of a building having an opening therein and a first outer side;
(b) a plastic conduit extending through said opening; and
(c) a fire-stopping apparatus comprising:
  (i) an annular metal casing adjacent the first outer wall, having two side walls, the outer edges and openings being aligned with the opening in the wall with the plastic conduit extending therethrough, and an outer annular wall extending between the outer edges of the side walls;
  (ii) an annular flange extending outwardly from the casing adjacent the first outer side of the divider,
  (iii) means for connecting the casing to the divider so one of said side walls is adjacent said first outer side and a second of said side walls is outwardly spaced from said first outer side, the means for connecting being on the annular flange,
  (iv) an annular member comprised of a intumescent material within the casing and extending about the conduit; and
  (v) an annular gasket extending inwardly from the casing and having an inner edge closely fitting about the conduit.

14. A barrier as claimed in claim 13, wherein the means for the connecting includes apertures on the flange.

15. A fire-retardant barrier, comprising:
(a) an internal divider of a building, the divider having internal structural members covered with panelling, the divider having an opening therein and a first outer side;
(b) a plastic conduit extending through said opening; and
(c) a fire-stopping apparatus comprising:
  (i) an annular metal casing adjacent the first outer wall, having two side walls with the outer edges and openings aligned with the opening in the wall, the plastic conduit extending therethrough, and a outer annular wall extending between the outer edges of the side walls,
  (ii) an annular flange between the structural members and the panelling, the annular flange extending outwardly from the casing adjacent the first outer side of the divider;
  (iii) means for connecting the casing to the divider so that one of said side walls is adjacent said first outer side and a second of said side walls is outwardly spaced from said side first outer side;
  (iv) an annular member comprised of a intumescent material within the casing and extending about the conduit, and
  (v) an annular gasket extending inwardly from the casing and having an inner edge closely fitting about the conduit.

16. A barrier as claimed in claim 15, wherein the divider has a second outer side, the barrier including a second said fire-stopping apparatus with said flange thereof being between the structural members and panelling on said second outer side.

* * * * *